United States Patent [19]

Carsner et al.

[11] Patent Number: 4,794,241

[45] Date of Patent: Dec. 27, 1988

[54] SCANNABLE DOCUMENT VELOCITY DETECTOR

[75] Inventors: George E. Carsner; John V. McMillin, both of Iowa City, Iowa

[73] Assignee: National Computer Systems, Eden Prairie, Minn.

[21] Appl. No.: 146,534

[22] Filed: Jan. 21, 1988

[51] Int. Cl.⁴ .............................................. G06F 7/016
[52] U.S. Cl. .................................... 235/474; 235/436; 235/456
[58] Field of Search ......................... 235/436, 456, 474

[56] References Cited

U.S. PATENT DOCUMENTS 4,152,895  5/1979  Weisbrod ........................... 235/474

Primary Examiner—Harold I. Pitts
Attorney, Agent, or Firm—Dorsey & Whitney

[57] ABSTRACT

The present invention relates generally to the field of optical mark readers and mark scanning systems. More particularly, the present invention relates to a method and system for checking the velocity of a scannable document as it travels under the read head of a mark scanning system.

11 Claims, 3 Drawing Sheets

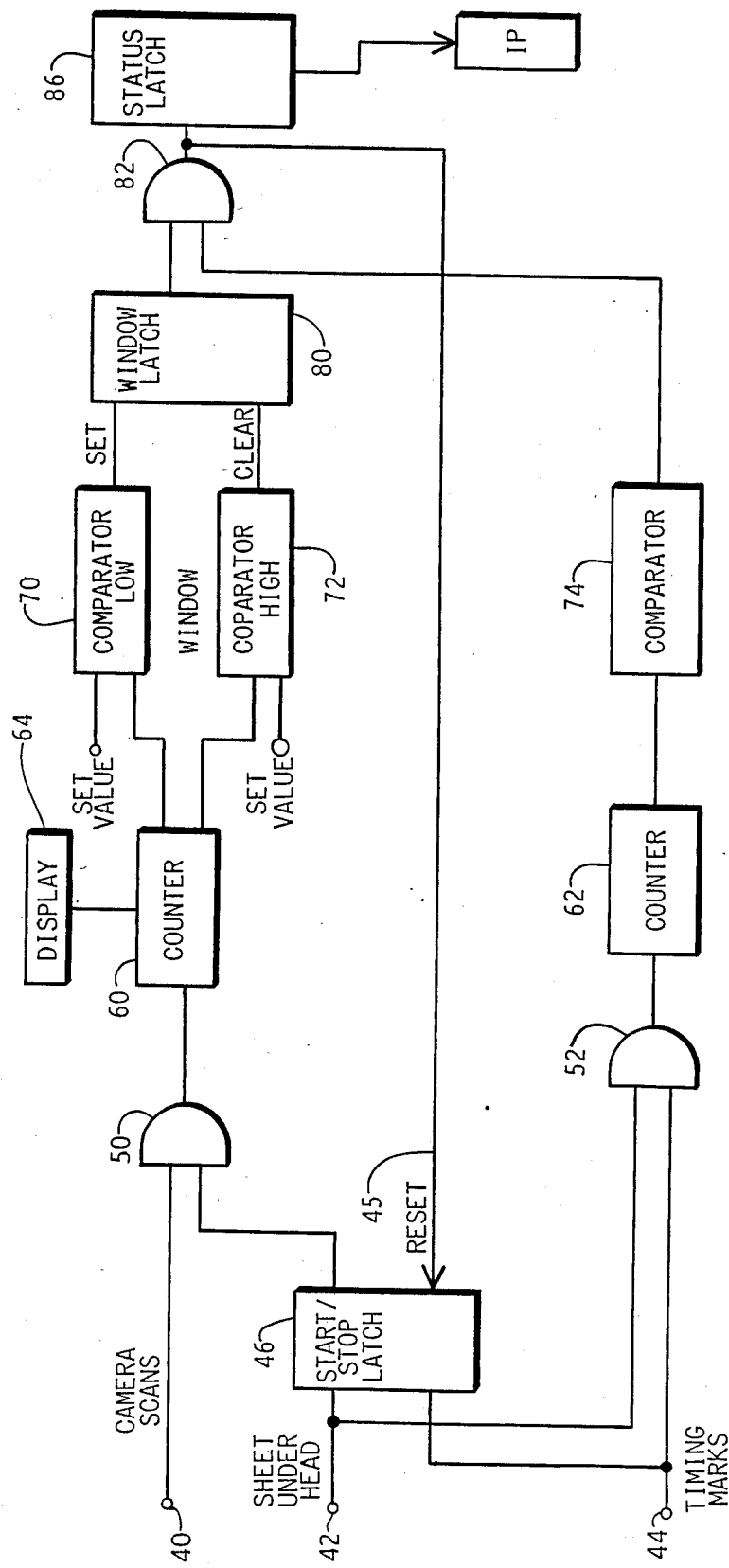

SCANNABLE DOCUMENT VELOCITY DETECTOR

BACKGROUND ART

Optical or conductive mark scanning systems of various speeds and types are well known in the prior art. Recently, high speed mark scanning systems have begun to use line scanning cameras or other high-frequency line scanning techniques to scan mark area or data response areas for detection of data marks on scannable documents. An example of such a system is in U.S. Pat. No. 4,300,123, issued Nov. 10, 1981 to J. McMillin et al. In this system, as in many others, the scannable document includes a plurality of timing marks in a "timing track" used to trigger the system to scan or "read" certain data marks or data response areas.

In any mark scanning system and, particularly, in a high speed mark scanning system, the relationship between each timing mark and the corresponding mark area or, more frequently, corresponding row of mark areas is important for proper scoring and interpretation of the scannable documents. In the type of mark scanning system shown in U.S. Pat. No. 4,300,123, a line scan camera runs at high speed and asynchronously with the travel of the scannable document through the scan or read area. This permits several line camera scans per row of mark areas. A multiple-pixel image of each mark area or data response area can thus be developed. This is accomplished in part by use of a software or firmware (PROM) template that isolates specific pixel image areas, so that these specific pixel image areas can be analyzed for the presence or absence of marks or data responses.

While the use of multiple scan lines per mark area row allows for greater resolution and more accurate detection of whether a data mark or data response has been recorded, reading errors can still occur. The system must accurately read each mark area or data response area that is associated with each timing track. Because this type of line scan system uses a fixed number of scan lines to program the amount of delay from detection of a timing mark until the beginning of the sensing of a mark area, it is important to insure that the document maintains a constant velocity while traveling under the reading head of the scanning system. Otherwise, the pixel image template is not in proper correspondence with areas scanned. Any slippage of the document after detecting a timing mark and occurring before or during scanning of the corresponding mark areas could result in an incorrect interpretation of whether a given mark area is marked or unmarked.

The fastest line scan document scanning systems handle and scan documents at a relatively high rate of speed, i.e. 10,000 or more documents per hour. At such speeds, there is always the possibility of slippage or drag as a document travels through the scanning system, due to the mechanical nature of the document handling mechanisms and the unpredictable surface conditions of documents that have been handled by humans. Such slippage may be either in the fomn of a linear slippage (a momentary slowdown as the document travels through the system) or in the form of skewing or rotational slippage (where one edge of the document travels through the scanning area faster than the parallel edge) While both types of slippage are undesirable, skewing of the document translates into a greater possibility of error in scanning the mark areas located farthest away from the timing mark column. Both linear slippage and skew slippage may be caused by: dirty rollers in the document handling mechanism; improper tension of the rollers in the handling mechanism; mutilated, torn or improperly sized scannable documents; foreign particles in the read area; or improper adjustment of the multi-sheet retard rollers in the document feed mechanism.

While the prior art systems are able to detect and respond to complete jam or document transport failure situations, a momentary slippage or skewing of the scannable document as it travels through the read area can go undetected and may lead to erroneous readings. While such errors have been found to be statistically infrequent in well-maintained equipment, for certain critical applications the misreading of even a small number of documents could have serious consequences, as for example, with career-determining test results. Accordingly, there is continuing need for improvements in methods and systems for checking the velocity of scannable documents in high speed mark scanning systems in order to detect momentary slippages or skewing of such documents and to prevent them from being improperly scored or interpreted.

SUMMARY OF THE INVENTION

In accordance with the present invention, a method and system for checking the velocity of scannable documents in a mark scanning system is provided. The system includes a high speed mark scanning means that utilizes a line scanning technique to detect the presence of a data mark at mark areas on a scannable document that has at least one column of timing marks (preferably, also detected by the mark scanning means) corresponding to the mark areas. The invention provides means for checking the velocity of the scannable document as it travels through the mark scanning system, by measuring the number of line scans executed in relation to a timing interval defined by a specified number of timing marks.

In one embodiment, a counter for counting the number of line scans that the scanning means performs is started when a first timing mark is detected. An acceptable range of line scan counts is defined, based on the expected speed of document transport until a second predetermined timing mark is encountered. This range is used to determine whether the scannable document has traveled through the read area at a velocity within the expected range. When the second predetermined timing mark is detected, the line scan counter value is compared to the acceptable range. If the value is within the range, a status latch is set to indicate that the scannable document traveled through the read area at an acceptable velocity. If the status latch is not set, slippage or skewing has occurred beyond the tolerances defined by the accepted range, and the scannable document may need to be rescored. This status can be noted electronically and, in systems including printers, can even be marked on the sheet after it leaves the scanning area. In addition, the affected document can be shunted into a separate output hopper.

A digital display or digital output of the line scan count at the time the second timing mark is encountered may also be provided to enable the operator or mark scanning system to observe actual count values and, if desired, specify the parameters for the acceptable range identified above. In the case where digital output of the line scan count is provided to the mark scanning system, a running average may be calculated from which a software-defined "window" or range can be determined. The system can thus automatically modify the acceptable range parameters to accommodate changes in the scanning environment and scanning conditions during the scanning of a large number of scannable documents..

Accordingly, a primary objective of the present invention is to provide a method and system for checking the velocity of scannable documents in a mark scanning system to enable the mark scanning system to detect when slippage or skewing of a scannable document has occurred.

Another objective of the invention is to prevent misscoring or misinterpretation of a scannable document subject to slippage or skewing.

A further objective of the present invention is to provide a method and system for checking the velocity of scannable documents in a mark scanning system that allows for an acceptable velocity range to be predetermined.

These and other objectives of the present invention will become apparent with reference to the drawings, the description of the preferred embodiment and the appended claims.

DESCRIPTION OF THE DRAWINGS

FIG. 3 is a schematic block diagram of the logical elements comprising the preferred embodiment of the present invention.

DESCRIPTION OF THE PREFERRED EMBODIMENT

Figure 1:
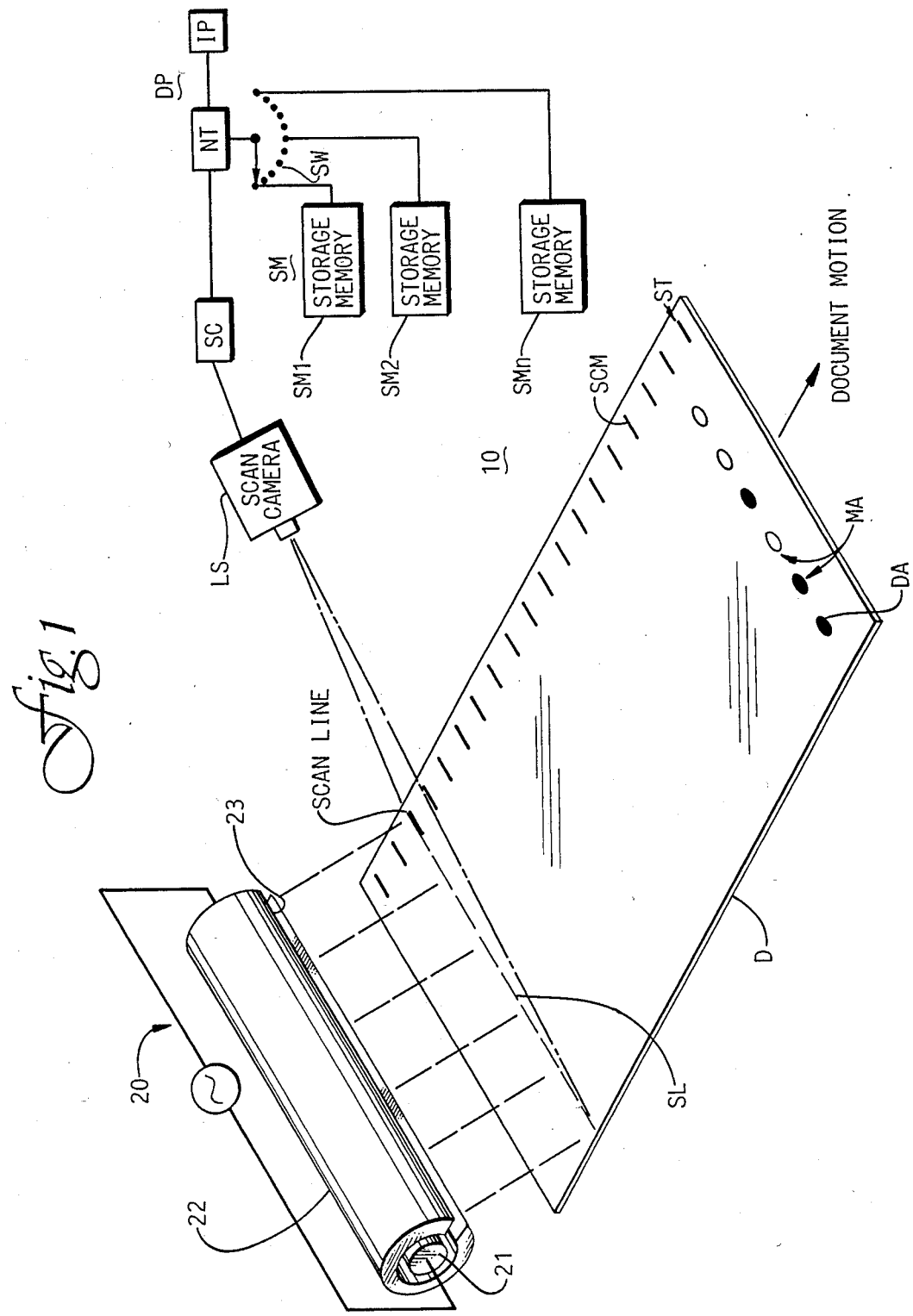
FIG. 1 is a schematic and block diagram illustration of a high speed mark scanning system utilizing a line scanning technique with which the present invention may be used.

Referring to FIG., 1 an optical scanning system 10 typical of a mark scanning system that could utilize the present invention is shown, along with scannable document D. This system is described in greater detail in U.S. Pat. No. 4,300,123, which is incorporated herein by reference. Document D exhibits a document format having a vertical scan track or timing track ST of timing marks or scan marks SCM and a pattern of mark areas MA. Each mark area MA is suitable for accepting a data mark DA in the mark area MA, typically produced by filling in mark area MA with a graphite pencil. Each scan mark SCM has a row of one or more mark areas MA associated with it. Scan line illumination of moving document D is provided by a line light source 20, which includes an elongated cylindrical incandescent lamp 21 in a tubular reflector 22 with diffuser strip window 23. The arrangement concentrates light on scan line SL.

In the optical mark scanning system 10 shown, the line scan camera LS generates a scanning sweep read out at a very high speed, e.g. approximately a 5 to 10 megahertz pixel rate. The optical information derived at each pixel or "scan point", by the camera LS is transmitted as an analog signal to analog signal processing circuit SC. This circuit digitizes the analog signal, producing, for example, a twobit digital signal, defining four levels of grey. The image transmitted by scan camera LS and digitizer circuit SC to digital processing means DP effectively represents a continous sequence of pixels for extracting optical information, comprised of 100 or more sensing elements per scanning inch for an 8½ inch wide scannable document. Thus, each mark area MA will be translated into a plurality of optical points to be processed by digital processing means DP. The digitized outputs from the analog signal processing circuit SC corresponding to the pixels are transmitted to a mark area totalizer MT which accepts and accumulates the digital levels for the predetermined mark areas MA of a document row of document D, as dictated by the stored document format of one element of storage memory slot SM. The particular document format is selected by selector switch SW, from the plurality available (SM1, SM2 . . . ). Information processor IP receives the output of the mark totalizer MT and performs the mark/non-mark discrimination task.

While reference is made to an optical scanning system 10 that utilizes a line scanning camera LS with an analog signal processing circuit SC, visible light line illumination source 20, and digital processing means DP (FIG. 1), it should be recognized that the present invention may be utilized with other types of scanning systems, including, for example, infrared scanning and electrically conductive scanning systems.

Assuming for purposes of discussion that the scanning direction of scan camera LS represents horizontal and the direction of movement of scannable document D represents vertical, the line sweeping action of scan camera LS in the horizontal direction will generate a plurality of optical scanning points, or pixels, while the motion of the document D will expose successive vertical increments or lines of the mark areas MA of a row of mark areas to scanning. Thus, as illustrated in FIG. 2, a plurality of scanning points or pixels in a two-dimensional array will define a mark area MA.

Figure 2:
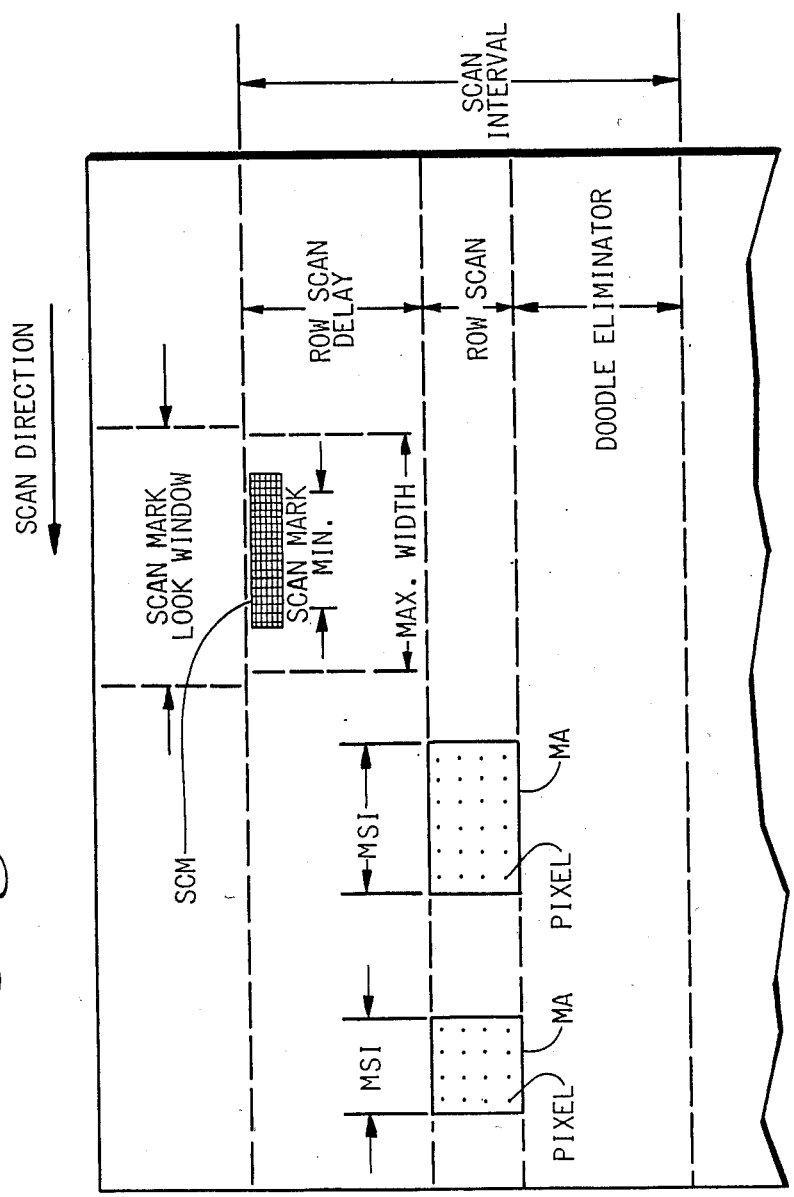
FIG. 2 is an illustration of a scannable document format of the kind used by the mark scanning system of FIG. 1, including the scan interval associated with a scan mark (timing mark) and the corresponding row of mark areas.

Referring further to FIG. 2, the scan mark parameters of the document formats stored in storage memory SM are shown. A scan mark or timing mark "look" or reading window is defined, including a minimum and maximum width for this mark. Mark area vertical parameters include Row Scan Delay, Row Scan and Doodle Eliminator, which together define a Scan Interval. The mark horizontal parameter, MSI, deals with the horizontal locations and horizontal dimensions of mark areas, defining their pattern along scan line SL of scan camera LS.

While the use of pixel images and pixel-defined document formats significantly increases the accuracy of detecting a data mark DA in a mark area MA, it also creates a need for accurate correspondence between scanned mark areas MA and the document format template stored in memory SM. As will be seen in FIG. 2, each Scan Interval, covering a row of mark areas MA and corresponding timing mark SCM, is divided into three vertical segments, Row Scan Delay, Row Scan, and Doodle Eliminator. In the preferred embodiment line scan camera LS scans from right to left across FIG. 2 and, at the desired document transport velocity will divide the Scan Interval into a specified number of horizontal strips that will be converted into a pixel data stream for processing by digital processing means DP. Because the Row Scan Delay and Row Scan correspond to a specified number of camera scans that are performed before or during the time at which the information relating to data marks DA it derived, it is apparent that velocity of scannable document D is critical in insuring that scan mark parameters defining the document format are accurately applied to the mark areas MA, as these are scanned from the scannable document 20. Slippage or skewing during the Row Scan Delay could cause the pixel template to be applied prematurely over the mark area. Slippage or skewing during the Row Scan could cause the same line location to be scanned twice. In either case, an error is possible.

A basic principle of the present invention is that the velocity of the document D can be checked by using the rapid scans of the scan camera LS as a clock. The clock is started on a specific timing mark (preferably, the first on a document D) and stopped at a specific timing mark (preferably the last on a document D). By experience or by calculation based on designed transport speeds, the expected number of line scans occurring between the two specified timing marks -- assuming no slippage -- can be determined, with an acceptable range of line scans defined to cover normal, minor variances in transport speed. Circuitry is thus needed that defines the start and end of a scan counting interval (or timing interval) in response to detection of a first and a later timing mark, together with circuitry to count the line scans during this interval.

FIG. 3 shows schematically the logic circuitry embodying a preferred form of the invention. Inputs to the circuit are at the left side of FIG. 3. Lines 40, 42 and 44 carry, respectively, the signals indicating: the occurrence of each camera scan, the presence of a document in the read area ("sheet under head") and the presence of each timing mark (scan mark). Start/stop latch 46 receives as input the sheet under head signal and the signal for each timing mark. Latch 46 can also receive a reset signal via line 45 from the output side of the circuitry in FIG. 3.

AND gate 50 receives as input the camera scan signal on line 40 and the output of the start/stop latch 46. In turn, AND gate 50 feeds its output signal to counter 60, which has an optional digital display 64 attached thereto to show the current scan count. The output of counter 60 goes to comparator low 70 and comparator high 72, which together define the "window" or range of camera scans expected if the document D is traveling at design-specified velocities, i.e. without slippage or skewing. Each comparator 70, 72 can be set to detect a specific value and to provide an output signal when that value is encountered. The output of comparator low 70, indicating that the low end of the range has been encountered, sets window latch 80. The output of comparator high 72, indicating that the high end of the range has been encountered, clears the window latch 80. The output of window latch 80 is one input to AND gate 82.

AND gate 52 has as one input the sheet under head signal and as the other input the timing mark signal. Thus, AND gate 52 passes a signal corresponding to each timing mark to counter 62 to maintain a count of timing marks. The count in counter 62 is, in turn, transmitted to comparator 74 which can be set to detect a specific value and to provide an output signal when that value is encountered. This value defines the last timing mark included in the timing interval for counting scans. When this last timing mark is encountered, comparator 74 sends a signal to AND gate 82.

If both inputs to AND gate 82 are present simultaneously, it provides an output to set status latch 86, which in turn signals the information processing means IP. Because AND gate 82 will produce an output only when the window latch has been set but not yet cleared, the output of AND gate 82 indicates that the line scan count was within the acceptable ranges (as defined by high and low comparators 70, 72) when the timing mark defining the end of the timing interval was encountered. This confims that the average velocity of the sheet over this interval was within acceptable ranges. If this were not the case, AND gate 82 would not set latch 86 and the status signaled to the information processing means IP would indicate a problem in the velocity. The information processing means IP can then cause appropriate action to be taken, such as marking the problem sheet or shunting it to a special output bin. The ability to report the exact velocity deviations will also permit the information processing means IP to detect or recognize any pattern of deviations or errors and take appropriate diagnostic action.

While the preferred embodiment of the present invention has been described in terms of a mark scanning system utilizing a line scanning technique, it should be noted that the method and system of the present invention could also be implemented on other types of mark scanning systems. For instance, on an older mark scanning system where a row of photo sensors are activated after a predetermined electronic delay once a timing mark has been sensed, a separate oscillator circuit having a frequency significantly greater than the frequency at which the timing marks are encountered could be used in place of the line scanning frequency input derived from line scan camera LS.

In another embodiment of the invention, some or all of the circuitry and logic shown in FIG. 3 might be implemented using software counters and/or comparator routines, for example in digital processing means DP, provided that the operating frequency of digital processing means DP substantially exceeds the sweep frequency of scan camera LS. The preferred embodiment of the present invention is shown using separate logic and circuitry because current microprocessors do not have high enough operating frequencies, and, therefore, it is not practical to have digital processing means DP perform both the pixel anaylsis and the scannable document velocity analysis.

It should also be noted that while the preferred embodiment of the invention is described in terms of velocity measurements against a series of timing marks, another embodiment of the present invention could be implemented using leading and trailing edges of scannable document D to denote the first and last timing marks. However, it is preferable to use timing marks SCM to denote the start and end of the measurement of the average velocity of scannable document D because, in general, timing marks SCM are located on scannable document D with more accuracy than the leading and trailing edges of the sheet can be trimmed. Also, at the operational speed of many high performance mark scanning systems, conventional photodetectors to sense the presence of the leading and trailing edge are not consistent enough to attain the necessary accuracy to accurately detect the velocity of scannable document D.

It should further be noted that more than one average velocity check could be made per sheet by programming comparator 74 to send output signals to AND gate 82 when, for example, half the timing marks have been counted as well as when all timing marks have been counted. Alternatively, the same feature could be implemented with two separate comparators.

The sheet under head signal 42 is generated by digital processing means DP, based upon an analysis of the pixel data generated by scan camera LS. Because scannable document D is printed on white or light colored paper and the interior of mark scanning system 10 is black or dark colored, processing means DP can analyze the pixel data stream to ascertain whether or not a scannable document D is under light illumination source 20 (i.e., under the reading head). (This same method, of white/black resolution is also utilized by processing means DP to detect an offset or skew condition when scannable document D first enters the read head area by checking to see if one-half of document D appears in the pixel data stream more than one scan line prior to the appearance of all of scannable document D in the pixel data stream.)

Although the description of a preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A device for checking the velocity of a scannable document, said document having a timing mark track and response mark areas in specified relation to said timing mark track, while said document is being transported past means for scanning response mark areas in a sequence of consecutive scanning operations occurring at a specified frequency, comprising:
    processing means for receiving signals from said means for scanning and for processing said signals to recognize a first timing mark on said document and subsequent timing marks;
    first counter means operatively connected to said processing means for counting the first and all subsequent timing marks;
    second counter means operatively connected to said scanning means for counting the number of consecutive scanning operations occurring after the first timing mark is recognized;
    first comparator means for receiving the count in said first counter means, comparing said count to a preselected value and producing a first comparator output signal when said count equals said preselected value;
    second comparator means for receiving the count in said second counter means, comparing said count to preselected high and low values and for producing a second comparator output signal when said count falls between said preselected high and low values; and
    velocity status detector means for receiving the first and second comparator output signals and for producing a velocity status acceptable signal only when said velocity status detector simultaneously receives said first and second comparator output signals.

2. A device for detecting variations in the expected velocity of a document scanned by scanning means having a specified scanning operation frequency, said document having a plurality of timing marks and a plurality of mark areas in specified relation to said timing marks, comprising:
    first counter means operatively connected to said scanning means for detecting and counting a first and each subsequent timing mark;
    second counter means operatively connected to said scanning means for counting each scanning operation occurring after the first timing mark is detected;
    first detector means responsive to said first counter means for determining when a specified number of timing marks has been counted;
    second detector means responsive to said second counter means for determining when the number of scanning operations counted is within a specified range; and
    third detector means responsive to first and second detector means for determining whether or not the number of scanning operations counted falls within the specified range at the same time as the specified number of timing marks is counted and producing a velocity status signal indicative of the occurrence or lack of occurrence of this condition.

3. A device for detecting variations in the expected velocity of a document scanned by scanning means having a specified scanning operation frequency, said document having a plurality of timing marks and a plurality of mark areas in specified relation to said timing marks, comprising:
    timing interval detection means operatively connected to said scanning means for determining a timing interval defined by a preselected start of interval timing mark and a preselected end of interval timing mark;
    scan counter means operatively connected to said timing interval detection means and said scanning means for counting the number of scan operations occurring during said timing interval; and
    scan velocity status means operatively connected to said scan counter means for detecting whether the number of scan operations occurring during said timing interval falls within a preselected range.

4. The device as recited in claim 3 wherein said timing interval detection means comprises a counter responsive to signals from said scanning means for counting the first and subsequent timing marks as these are scanned up to a preselected count to thereby define said timing interval as the time between counting of the first timing mark and reaching the preselected count.

5. The device as recited in claim 4 wherein said scan velocity status means comprises a first comparator having as an input the lower value of said preselected range and a second comparator having as an input the higher value of said preselected range.

6. The device as recited in claim 5 wherein said scan velocity status means further comprises a latch responsive to said timing interval detection means and said first and second comparators, said latch providing an output only when said scan counter means provides a value within said preselected range at the end of said timing interval.

7. The device as recited in claim 3 further comprising means for receiving said count of the number of scan operations occurring during said timing interval and for selectively modifying said preselected range based upon the results of a running average of said counts received for a predetermined number of previously scanned documents.

8. A method for detecting whether the velocity of a scannable document being transported past scanning means in a mark scanning system having a specified scanning operation frequency is within a preselected range of expected velocities, said document having a plurality of timing marks and a plurality of mark areas corresponding to at least one of said timing marks, comprising:

transporting said document past said scanning means;

detecting a first of said timing marks;

counting said scanning operations of said scanning means after detection of said first of said timing marks;

detecting a second of said timing marks;

terminating said counting of said scanning operations after detection of said second of said timing marks, thereby generating a finite count of the number of scanning operations occurring in the time interval between detection of said first of said timing marks and said second of said timing marks; and comparing said count to a preselected range of acceptable counts representing said preselected range of expected velocities to determine whether said count is within said range of acceptable counts, thereby indicating that said document was transported past said scanning means at a velocity within said range of expected velocities.

9. The method as recited in claim 8 further including the step of setting a status latch for said mark scanning system to indicate whether said count is within said preselected range of acceptable counts.

10. The method as recited in claim 8 further including the step of communicating said count of the number of scanning operations occurring in said time interval between detection of said first of said timing marks and said second of said timing marks to an information processing means in said mark scanning system for diagnostic analysis.

11. The method as recited in claim 8 wherein said first of said timing marks is the first mark detected by said scanning means and said second of said timing marks is a preselected number of timing marks after said first timing mark.

* * * * *

UNITED STATES PATENT AND TRADEMARK OFFICE
CERTIFICATE OF CORRECTION

PATENT NO. : 4,794,241
DATED : December 27, 1988
INVENTOR(S) : George Carsner & John McMillin It is certified that error appears in the above-identified patent and that said Letters Patent is hereby corrected as shown below:

Column 1, line 62, delete "fomn" and insert --form-- therefor.

Column 8, line 9, delete "deternmining" and insert --determining-- therefor.

Column 1, line 66, after the words, "after edge)" insert a --.-- therefor.

Column 4, line 4, delete "continous" and insert --continuous-- therefor.

Signed and Sealed this

Third Day of October, 1989

Attest:

DONALD J. QUIGG

*Attesting Officer*  *Commissioner of Patents and Trademarks*